US006983667B2

(12) United States Patent (10) Patent No.: US 6,983,667 B2
Cuerden et al. (45) Date of Patent: Jan. 10, 2006

(54) IMPACT MICRO-POSITIONING ACTUATOR

(75) Inventors: Brian Cuerden, Tucson, AZ (US); J. Roger P. Angel, Tucson, AZ (US); James H. Burge, Tucson, AZ (US); Scott T. DeRigne, Tucson, AZ (US)

(73) Assignee: University of Arizona, Tucson, AZ (US)

( * ) Notice: Subject to any disclaimer, the term of this patent is extended or adjusted under 35 U.S.C. 154(b) by 0 days.

(21) Appl. No.: 10/202,431

(22) Filed: Jul. 23, 2002

(65) Prior Publication Data

US 2002/0175579 A1 Nov. 28, 2002

Related U.S. Application Data

(60) Provisional application No. 60/307,202, filed on Jul. 23, 2001.

(51) Int. Cl.
*F16H 25/20* (2006.01)
(52) U.S. Cl. ....................................... 74/89.23; 74/89.1
(58) Field of Classification Search .................... 74/25, 74/89.23, 127, 89.1
See application file for complete search history.

(56) References Cited

U.S. PATENT DOCUMENTS

| 1,459,402 | A | * | 6/1923 | Johnson ........................ 173/108 |
| 2,882,772 | A | * | 4/1959 | Potter ............................ 173/93 |
| 3,207,961 | A | * | 9/1965 | Lohr ............................. 335/255 |
| 3,211,028 | A | * | 10/1965 | Christensson ................ 173/93 |
| 5,410,206 | A |   | 4/1995 | Luecke et al. |
| 5,511,438 | A | * | 4/1996 | Aki .............................. 74/89.43 |
| 5,522,579 | A | * | 6/1996 | Rock ........................... 249/219.1 |

FOREIGN PATENT DOCUMENTS

| DE | 25 54 315 | * | 6/1976 |
| EP | 0 478 928 | * | 4/1992 |

OTHER PUBLICATIONS

Cuerden, Brian et al., "A Linear Micro-Positioning Actuator for Ambient and Cryogenic Operation," Steward Observatory, The University of Arizona.

* cited by examiner

*Primary Examiner*—William C Joyce
(74) *Attorney, Agent, or Firm*—Quarles & Brady Streich Lang LLP (57) ABSTRACT

An impact micro-positioning actuator. In one aspect of the invention, a threaded shaft is threadably received in a nut and the nut is impacted by an impacting device, causing the nut first to rotate relative to the shaft by slipping as a result of shaft inertia and subsequently to stick to the shaft as a result of the frictional force therebetween. The nut is returned to its initial position by a return force provided by a return mechanism after impact. The micro-positioning actuator is further improved by controlling at least one and preferably all of the following: the friction, the impact provided by the impacting device, the return force provided by the return mechanism, and the inertia of the shaft. In another aspect of the invention, a threaded shaft is threadably received in a nut and the shaft is impacted by an impacting device, causing the shaft to rotate relative to the nut.

13 Claims, 5 Drawing Sheets

IMPACT MICRO-POSITIONING ACTUATOR

REFERENCE TO RELATED APPLICATIONS

This application claims the benefit of the inventors' provisional application, U.S. Ser. No. 60/307,202, filed Jul. 23, 2001.

FEDERALLY SPONSORED RESEARCH

This application is based on research sponsored by NASA, Marshal Contract NAS 8-97309.

BACKGROUND OF THE INVENTION

The present invention relates to an impact micro-positioning actuator providing for precision micro-positioning at temperatures ranging from ambient to cryogenic.

Micro-positioning actuators have many applications, and are used generally for optical or mechanical systems requiring precise alignment. A most demanding application is in outer space on large devices of lightweight construction. Such devices must rely on active control to maintain required dimensional stability. Micro-positioning actuators have been used, for example, to produce large mirrors suitable for use in an orbiting telescope, wherein a thin, flexible mirror element is rigidly attached at many points to a stiff carbon composite structure through corresponding micro-positioning actuators. Such systems must be operable at the cryogenic temperatures of space, and it is desirable to be able to operate the devices at ambient temperature on earth as well, to facilitate testing the systems. Micro-positioning actuators used for one-time or repeated adjustments of cryostats must also be operable at cryogenic temperatures.

It is always important to provide micro-positioning actuators with sufficient durability, reliability, and precision for the application, and this is especially difficult where the actuators are exposed to extremes of temperature. It is also important to minimize hysteresis in micro-positioning actuators that must be cycled, and to minimize their cost and weight, the latter being especially important in space applications. Another highly desirable feature in a micro-positioning actuator employed in outer space is the ability to hold a position without the application of power, to conserve power as well as to prevent the production of excess heat which is more difficult to dissipate in outer space due to the lack of a convective heat loss mechanism.

A commonly used precision actuator is the stepper motor. Stepper motors, however, have significant disadvantages as micro-positioners, especially for applications such as described above where high precision and low weight are of premium importance. In particular, very small stepper motors provide a limited number of steps per revolution, such as about 16, so that a gear train is also required for micro-positioning. The gear train adds cost and weight, and introduces random positioning errors, particularly hysteresis due to backlash. Moreover, a stepper motor adapted for use at both ambient and cryogenic temperatures, though possible, would be relatively expensive.

Another strategy for micro-positioning is the piezoelectric actuator such as described in Luecke, et al., U.S. Pat. No. 5,410,206 ("Luecke"). A piezoelectric element is mounted in a frame having a pair of jaws between which is disposed a threaded output shaft to be driven by the jaws. The piezoelectric element is operative to effect reciprocating motion of at least one of the jaws. The reciprocating motion of the jaw against the output shaft is converted to an incremental rotary motion by moving the jaw relatively slowly in a first direction such that the coefficient of friction between the shaft and the jaw overcomes the inertia of the shaft, and moving the jaw relatively fast in a second direction such that the inertia of the shaft prevents it from following the jaw, so that the shaft slips between the jaws to preserve the preceding incremental motion. Accordingly, a cyclic electrical signal applied to the piezoelectric element that is slowly rising and rapidly falling causes the shaft to rotate in one direction, and where the signal is rapidly rising but slowly falling, the shaft rotates in the opposite direction.

Although the Luecke device is mechanically simple and therefore can be implemented at lower cost than stepper motors, it has serious drawbacks for use at cryogenic temperatures. Particularly, the piezoelectric effect at cryogenic temperatures is an order of magnitude smaller than the effect at room temperature. Therefore, a complex calibration and compensation scheme would be required to produce a system that operates repeatably at both temperature extremes. Moreover, piezo-materials that function well at room temperature do not function well at cryogenic temperatures and vice versa. For these reasons, it is difficult or impossible to scale a piezoelectric micro-positioned to repeatably position a range of loads over a range of temperatures.

The present inventors have proposed an alternative impact micro-positioning concept in a paper entitled "A Linear Micro-Positioning Actuator for Ambient and Cryogenic Operation." The actuator was to take the form of a shaft threaded into a nut which is impacted with a small mass to cause momentary rotation. A torsional spring was proposed to restore the nut to its initial position after each impact. The shaft was preloaded to obtain a particular frictional torque between the nut and the shaft. The preload was proposed to set a frictional force between the shaft and nut that would be lower than the force required to accelerate the shaft at the high initial angular acceleration of the nut on impact. As a result, the angular position of the shaft would lag behind the nut after impact. However, as the nut is thereafter decelerated by the torsion spring, a point is reached where the force required to turn the shaft at the same rate falls to a level at or below the frictional force, so the shaft and nut move together as the nut returns to its original position. The result of the cycle is that some of the initial advancement of the nut relative to the shaft is preserved.

It was further proposed that the speed and momentum of the impacting mass could be adjusted to vary the relative motion of the shaft and nut and hence the step size. Motion in two directions was proposed to be provided by two separate impactors. A prototype was fabricated and was reported to provide repeatable and reliable steps of from 10 to 100 nm at the 77 degrees Kelvin.

The impact micro-positioning device solved the problems inherent in the Luecke piezoelectric actuating device. However, subsequent testing revealed that the device did not perform reliably over the required ranges of temperature, stroke and direction required for many applications, including applications in outer space. Accordingly, there is a need to refine the concept of an impact micro-positioning device in a number of its aspects to realize the full benefit of the concept.

SUMMARY OF THE INVENTION

The present invention, in a first aspect thereof, meets the challenge of improving the reliability of an impact micro-positioning actuator wherein a threaded shaft is threadably received in a nut and the nut is impacted by an impacting device, causing the nut first to rotate relative to the shaft by slipping as a result of shaft inertia and subsequently to stick to the shaft as a result of the frictional force therebetween. The nut is returned to its initial position by a return force provided by a return mechanism after impact. As a result, relative motion between the shaft and the nut is preserved.

The micro-positioning actuator may be further improved according to the present invention by controlling at least one and preferably all of the following: the friction, the impact provided by the impacting device, the return force provided by the return mechanism, and the inertia of the shaft.

To control friction, a biasing device is provided that laterally biases the shaft against the nut. The biasing device bears against a selected one of the nut and the shaft with less friction than is caused to be present between the nut and the shaft, so that the latter is dominant.

To control the impact, a substantially elastic collision between the impacting mechanism and the nut is provided.

To control the nut return force, a return mechanism preferably includes a plurality of n leaf springs arranged to provide a torsional spring return force to the nut. Of the n leaf springs, n−1 of the leaf springs are preferably provided with slip joints permitting expansion or contraction of the leaf springs with respect to respective points of attachment of the leaf springs as a result of increasing or decreasing temperature.

To control the inertia of the shaft, an inertial adjustment disk is preferably provided that is attached to the shaft.

In a second aspect of the invention, an impact micro-positioning actuator is provided wherein a threaded shaft is threadably received in a nut and the shaft is impacted by an impacting device, causing the shaft to rotate relative to the nut. Preferably, both impact micro-positioning and continuous micro-positioning is provided.

Accordingly, it is a primary object of the present invention to provide a novel and improved impact micro-positioning actuator.

It is another object of the present invention to provide a micro-positioning actuator providing for both impact and continuous micro-positioning.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

1. First Embodiment of an Impact Micro-Positioning Actuator

Figure 1:
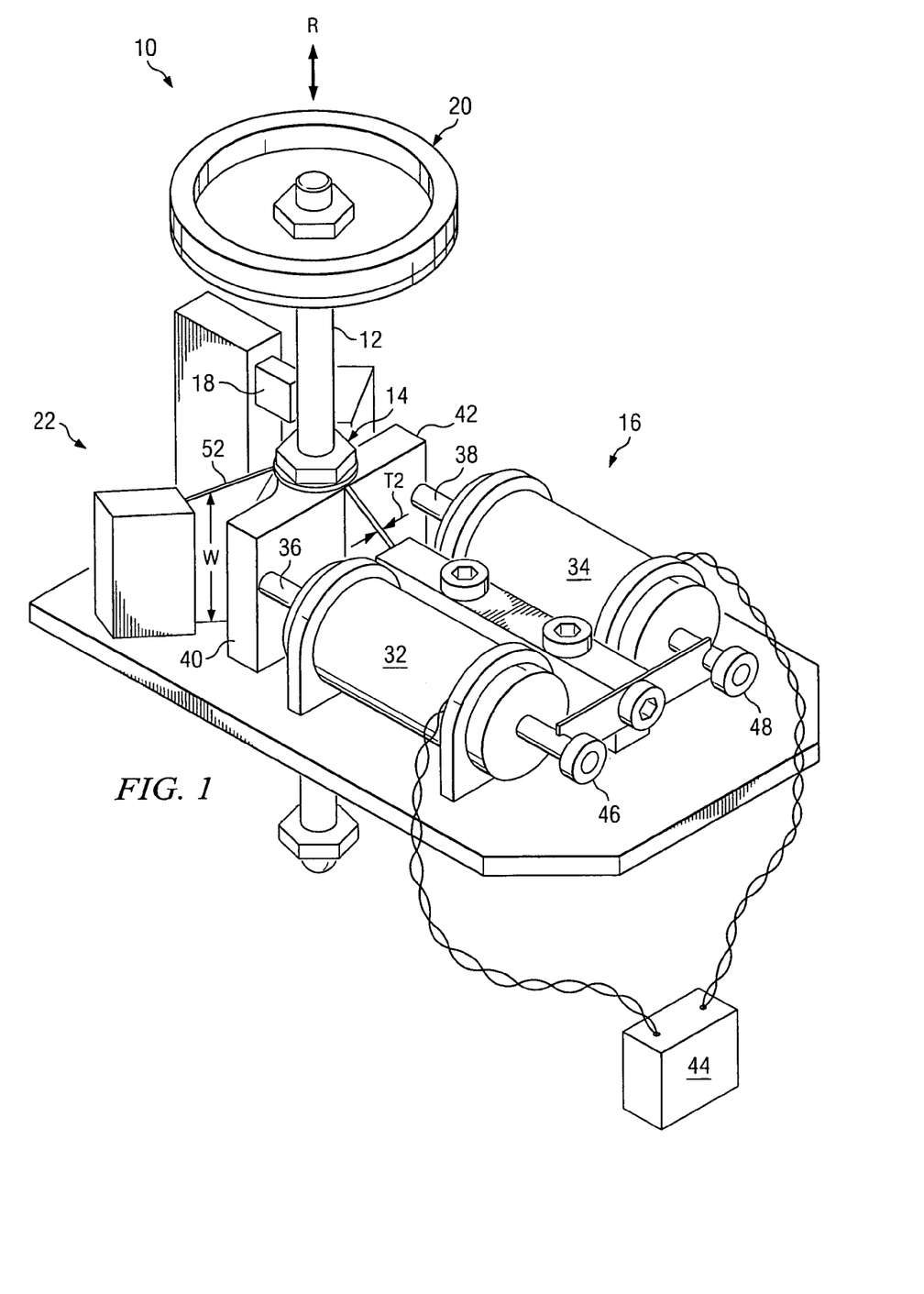
FIG. 1 is a pictorial view of a first embodiment of an impact micro-positioning actuator according to the present invention.

An impact micro-positioning actuator 10 according to the present invention is shown in FIG. 1. The impact micro-positioning actuator 10 is used to adjust linear position with very high precision. For high precision, the actuator 10 includes a fine threaded shaft 12 received in a correspondingly fine threaded nut 14, though coarser threads may be used without departing from the principles of the invention. An end of the shaft is used to position an object, which may be a mirror in an orbiting telescope or any other object, as a result of relative movement of the shaft and nut. To produce relative movement of the shaft 12 and nut 14, and therefore to produce linear stepping of the shaft for positioning the object, an impacting device 16 is positioned to provide an impact force to the nut.

The nut 14 is coupled to a return mechanism 22 for decelerating the nut and returning it to its original position after impact. However, the shaft moves relative to the nut according to the principles of the invention because of friction between the nut and the shaft. For example, if there were no friction between the shaft 12 and the nut, no movement of the nut would be transmitted to the shaft. The nut would spin in one direction about the shaft and then be returned in the other direction to its original disposition with respect to the shaft. At the other extreme, if the shaft and nut are rigidly mounted together, the shaft and nut would always move as one, so that no relative movement would be possible.

The first embodiment of the invention is based, in part, on a recognition of the advantage of providing a "slip-stick" operation in an impact micro-positioning device. In the micro-positioning actuator 10, the nut first slips around the shaft in response to the impact due to the inertia of the shaft, but later sticks to the shaft as a result of friction between the nut and the shaft as the nut decelerates and, eventually, is returned by the return mechanism 22.

As mentioned above, a prototype impact micro-positioning actuator employing the slip-stick concept was previously proposed by the inventors. However, testing of the prototype revealed that the device did not perform reliably over the required ranges of temperature, stroke and direction required for many applications, including applications in outer space. For example, step size varied when the direction of motion was reversed, so that after reversal the first steps were sometimes very large or sometimes even in the wrong direction. It was also recognized that movement of the shaft was not reliable over appreciable stroke lengths.

According to the invention, a number of structures and methods for controlling the friction, the impact provided by the impacting device, the return force provided by the return mechanism, and the inertia of the shaft particularly adapted for the first embodiment of the invention. Such control aspects of the invention are provided as described below.

2. Control of Friction

It is an outstanding recognition according to the present invention that friction between the nut and the shaft should be controlling. This friction is controlled according to the invention by providing a number of features. First, it is recognized that the surface finishes of the mating threads of the nut and the shaft should be carefully treated. Preferably, fine, cooperating surface finishes are provided by lapping the threads of the nut and shaft together, i.e., the shaft is inserted into the nut and the nut is run up and down the shaft repeatedly, with successively finer polishing grits between the threads. This method produces surface finishes and a clearance between the nut and the shaft providing that friction between these parts is substantially independent of relative rotation between the nut and the shaft. Other surface treating means providing the same or similar result may be employed without departing from the principles of the invention.

Second, a dry lubricant is preferably provided between the nut 14 and the shaft 12; particularly, a dry lubricant such as tungsten disulphide or molybdenum disulphide to prevent freezing of the lubricant at cryogenic temperatures. The lubricant is suspended in a carrier solvent. The lubricant is applied preferably by dipping the threaded shaft in the lubricant. The shaft is maintained in a vertical orientation until the lubricant dries, providing for a uniform thickness circumferentially. The coating is then baked to drive off residual solvent. The shaft is then run in and out of the nut a number of times, e.g., about ten times, to "wear in" the coating. The aforementioned lapping operation is preferably carried out so that the desired clearance between the nut and the shaft is achieved considering the amount of lubricant that is to be applied. This method for applying the lubricant produces a lubricating layer of substantially constant thickness, which preserves the constancy of the friction between the nut and the shaft provided by the surface finishes. Other methods producing the same or similar result may be employed without departing from the principles of the invention.

Figure 2:
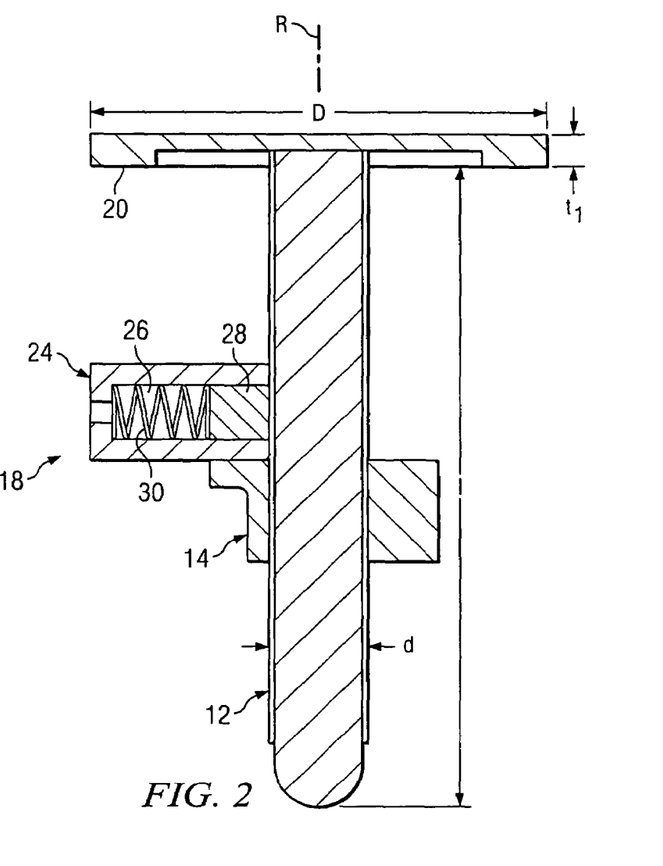
FIG. 2 is a side section of a biasing element of the impact micro-positioning actuator of FIG. 1 according to the present invention.

Third, as seen in FIG. 2, a biasing device 18 is provided for biasing the nut 14 and the shaft 12 against one another, to increase the friction between these parts to a desired level consistent with providing a desired amount of rotation at which slip ceases between the nut and the shaft and the parts stick together.

In a preferred embodiment of the device 18 there is a housing 24 having a guide bore 26. A bearing member 28 fits closely into the guide bore 26 to prevent wind up. In the example shown, the housing 24 is mounted to the nut and the bearing member 28 presses on the shaft; however, this configuration may be reversed as well.

A biasing element 30 such as a compression spring as shown biases the bearing member 28 to cause the bearing member 28 to exert a predetermined force on the shaft 12 to bias the shaft against the nut.

It is desired that the biasing element 30 provide a substantially constant force during rotation of the nut or shaft. Therefore, the shaft 12 should be radially symmetric about its axis of rotation "R," so that the compression of the spring 30 is not changed substantially as a result of relative rotation between the nut and the shaft. Accordingly, the biasing element need not have any particular force-displacement characteristic, and may be, for example, a plastic material, a compressible fluid or in terrestrial applications, a simple weight.

Figure 3:
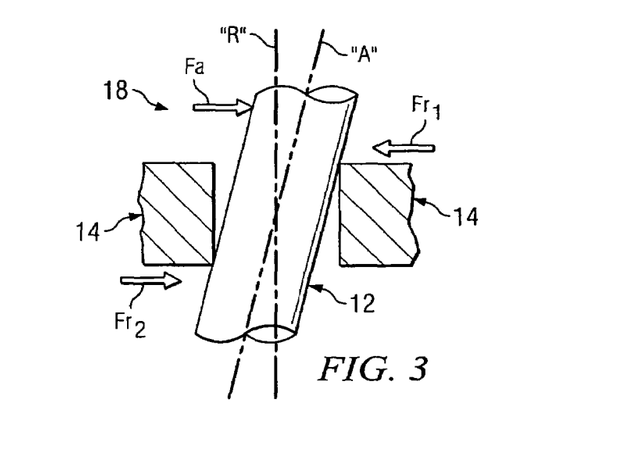
FIG. 3 is a cross-section of the nut and shaft of FIG. 2 shown with a biasing force being applied.

Referring to FIG. 3, the shaft 12 is shown biased against the nut 14 by the biasing device 18 with a biasing force Fa. The amount of lateral movement of the elongate axis "A" of the shaft with respect to the axis of rotation "R" is shown highly exaggerated. There are two reaction forces $Fr_1$ and $Fr_2$ at the nut 14. The required balancing of the forces and the torques implies that the reaction force $Fr_1$ must be greater than the applied force Fa, due to the presence of the reaction force $Fr_2$. The force of friction between the nut and the shaft is proportional to these reaction forces, while the force of friction between the biasing member and the shaft is proportional to the applied force, so that the friction force between the biasing member 18 and the shaft will, all else being equal, be less than the friction force between the shaft and the nut as a result of employing the biasing member.

However, it is desirable, to ensure that friction between the nut and the shaft is controlling, that friction between the biasing member 28 and the shaft 12 is made at least about three times less than the friction between the nut and the shaft. It has been found that mechanical grade polytetrafluroethylene ("PTFE") is a superior material for this purpose, not only because it provides low friction but also because it minimizes cold flow into the threads of the shaft. By contrast, virgin PTFE has been found to cold flow and defeat the friction control provided by the features mentioned above, especially after the device is cooled to cryogenic temperatures where the bearing member may stick to the shaft and prevent relative rotation of the shaft and the nut altogether.

The magnitude of the frictional force is controlled by the materials and surface finishes used for the threads of the nut 14 and shaft 12, and by the amount of force applied by the biasing element 30. The shaft is preferably formed of stainless steel, such as 400 series steel, and the nut is preferably formed of a low alloy steel such as 4130 or 4340. It is believed that the particular selection of these materials also contributes to controlling friction, and the materials desirably provide substantially matched thermal expansion characteristics so that the nut and the shaft do not have excessive play at one extreme of temperature, and do not bind at the other extreme.

It should be noted that the aforementioned features each contribute to controlling the frictional force between the shaft and the nut and may be employed separately as well as in combination within the principles of the invention.

3. Control of Impact

Figure 4:
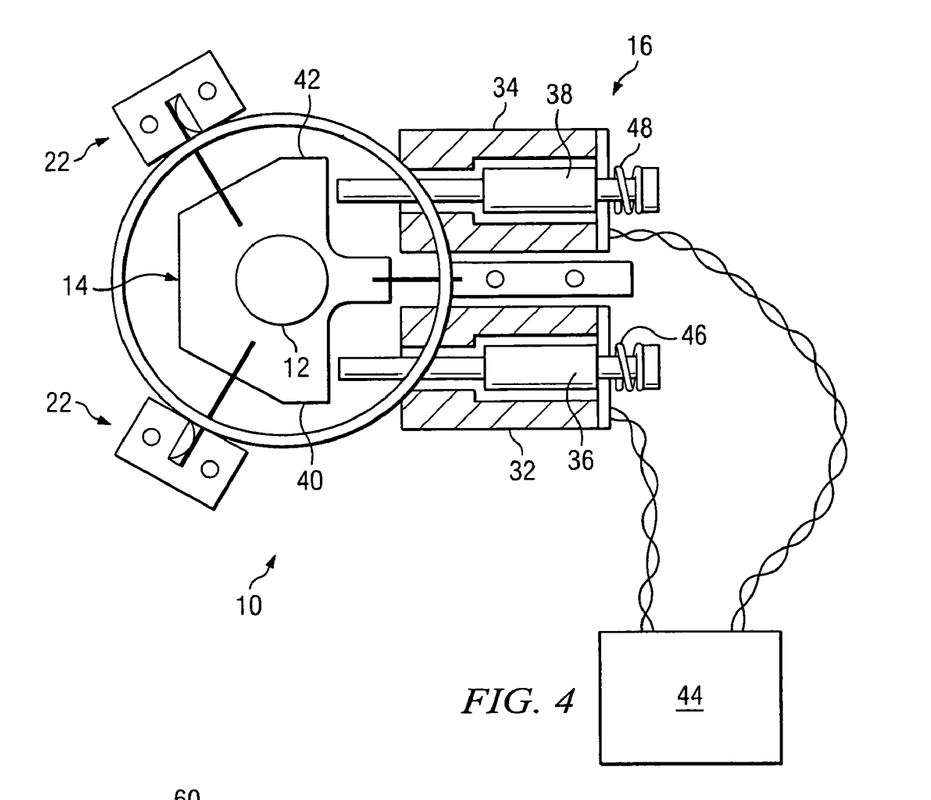
FIG. 4 is a plan view of the micro-positioning actuator of FIG. 1, showing an impacting mechanism according to the present invention in section.

It is recognized according to the present invention that reliable operation of the device 10 to control the impact provided by the impacting device 16 and the nut 14. To provide this control, the impacting device is simply and preferably implemented as two solenoids 32 and 34 having respective reciprocating drive hammers 36 and 38 as shown in FIG. 4. One of the solenoids is used to rotate the nut in one direction, and the other solenoid is used to rotate the nut in the opposite direction, to provide for stepping of the shaft in two directions. A current input to a selected one of the solenoids produces a magnetic field therein causing the corresponding hammer to be thrust outwardly in the direction of the arrow toward the nut. The flow of current is preferably stopped prior to impact so that a simple elastic collision between the hammer and nut results. It is preferably provided that the hammer is significantly less massive than the nut, so the hammer rebounds from the nut; the nut is in any case provided with an initial angular velocity of rotation about an axis of rotation "R" as a result of the impact.

Hammer returns 46 and 48, located on the solenoids, return the respective hammers to their original positions after impact. The hammer returns can be springs or other devices or members adapted to retract the hammers within the time necessary to prevent a secondary collision with the nut. However, it is recognized that the return force provided to the hammers should be no more than is required, because additional force causes positioning irregularities. To appreciate this, it should be noted that light weight solenoids have non-linear accelerating characteristics. Particularly, acceleration of the drive hammers increases toward the end of their travel before the nut 14 is impacted. On the other hand, the force provided by the hammer returns in a spring embodiment thereof is linear with travel. A stronger spring must be overcome with a larger solenoid current, which increases the rate of change in acceleration at the end of travel, leading to a more variable impact velocity.

A control system 44 for controlling the impacting device 16 provides a predetermined magnitude and duration of the current that is applied to the solenoids to accelerate the drive hammers. The strength and duration of the pulse provided by the control system is optimized to achieve uniformity in step size. Particularly, pulse width and step size are determined for each actuator by testing. The current required to yield a desired relative rotation of the nut 14 and the shaft 12 ("step size") is determined for several pulse widths, for each impacting device 16. A pulse having a desired magnitude and width is selected that provides the most consistent step size for the respective impacting device, providing for optimized control of the impacting device 16 corresponding to each direction of rotation.

The nut 14 includes shoulder portions 40 and 42, which receive the impact of the respective hammers 36 and 38. At least the tips of the hammer and at least the surface of the shoulder portions 40 and 42 are formed of materials having a high elastic modulus to provide for the desired elastic collision between the hammers and the nut. To the extent the collision is not elastic, kinetic energy will be lost in the collision, decreasing the initial velocity of the nut and thereby lowering the efficiency of the device. Moreover, deformations in either the drive hammers or the nut that would otherwise result from one or a series of inelastic collisions uncontrollably change the amount of impact velocity imparted to the nut. Tempered or hardened steel is an exemplary material for providing the desired elastic collisions, so at least the ends of the drive hammers are preferably formed of a hardened steel, and where the nut is formed of low alloy steel it is also preferably tempered or strain hardened at least at the shoulder portions.

It should be noted that the aforementioned features each contribute to controlling the impact with the nut and may be employed separately as well as in combination within the principles of the invention. Moreover, while a preferred impacting mechanism 16 has been shown and described as preferred, any impacting mechanism that results in a controlled initial angular velocity of the nut may be used without departing from the principles of the invention.

4. Control of Shaft Inertia

As indicated above, the nut 14 slips around the shaft 12 in response to impact because the frictional force produced by the biasing device 18 is too low to prevent slippage, at least initially. More particularly, the frictional force is too low to overcome the resistance to acceleration put up by the shaft 12 as a result of its inertia. It is recognized as being desirable to control this inertia, particularly, the moment of inertia of the shaft about its axis of rotation "R." Returning to FIG. 2, the shaft is typically elongate, having a diameter "d" that is perpendicular to and smaller than its length "l."

Therefore, while the shaft may be machined very carefully to provide a desired inertia, the inertia cannot easily be controlled in this manner, and cannot easily be varied as may be desired.

To solve this problem according to the present invention, the shaft 12 preferably includes an inertial adjustment disk 20 which may be attached to an end of the shaft, or anywhere along the shaft. The inertial disk 20 is preferably balanced about the axis "R" of rotation of the shaft and has a predetermined diameter "D" and thickness "$t_1$," depending upon the amount of adjustment to shaft inertia that is desired. These dimensions may be provided as manufactured or may be adjusted to suit a particular shaft.

Because the diameter of the disk is greater than its thickness, fine adjustments to inertia can be made relatively easily and economically. Moreover, the inertia can be varied over a relatively wide range. The disk 20 may in fact provide most of the inertia of the shaft and, therefore, may be used to control the inertia of the shaft even without measuring the inertia of the shaft and configuring the disk accordingly as might otherwise be required. In any event, the amount and ease of control of shaft inertia is increased substantially by use of the disk 20.

It is also desirable to provide a sufficiently high torsional stiffness in the shaft 12 so that the friction between the nut and the shaft does not permit the nut to "wind up" the shaft relative to the inertial disk 20 as the nut accelerates. Accordingly, a suitable diameter "d" of the shaft is maintained even with the inertial disk, in consideration of the modulus of elasticity of the material used.

5. Control of Return of the Nut

Figure 5:
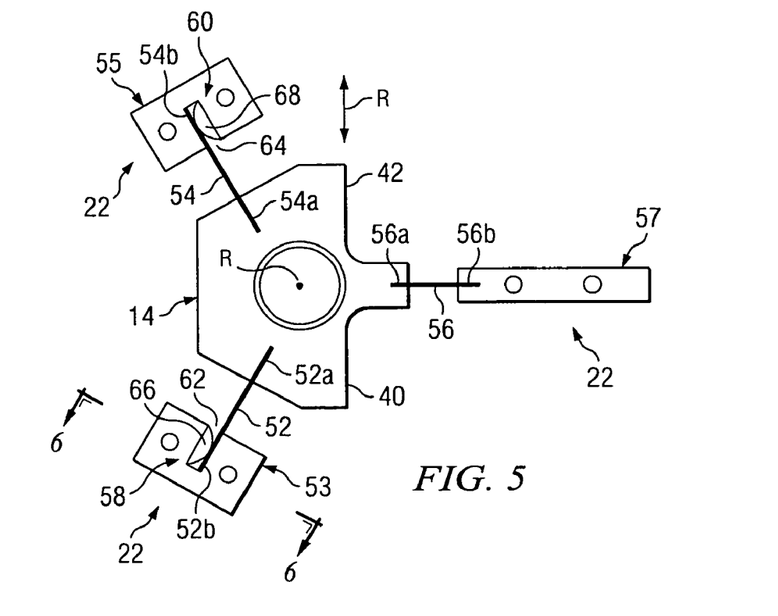
FIG. 5 is a plan view of a return mechanism for the micro-positioning actuator of FIG. 1 according to the present invention.

The shaft 12 must be able to move as well as support an object, and the nut 14 should be able to support the shaft along with this load while, at the same time, permitting the shaft to rotate substantially freely about the nut except as provided by the biasing device 18. Accomplishing these objectives places severe requirements on the support mechanism. It is an outstanding feature of the present invention to provide a return mechanism 22 that is able to support large axial loads in addition to providing a returning feature. Turning to FIG. 5, in a preferred embodiment of the invention, the return mechanism 22 comprises a plurality of leaf springs such as 52, 54, and 56 radially extending from the nut and anchored respectively by corresponding anchoring members 53, 55, and 57. By virtue of the linearity of the force deflection characteristic of the leaf springs, the return mechanism applies a torsional return force to the nut about the axis "R" that is substantially proportional to the angle of rotation of the nut caused by the impact; however, this is not essential to the invention. By virtue of the leaf springs, the return mechanism 22 applies a greater return force when the nut is maximally deflected from its initial angular position, and the return force is decreased as the nut accelerates back to its initial angular position. This action is desirable to minimize acceleration during return, and therefore to minimize the potential for the nut to slip with respect to the shaft during return. This is not essential to the invention either, though it enhances repeatability of the actuator 10 and is therefore preferred.

With additional reference to FIG. 1, where the return mechanism 22 employs leaf springs as described above, the leaf springs are substantially wider (dimension "w") than they are thick (dimension "$t_2$"), to provide for a high stiffness in the direction of axial loading while at the same time permitting the flexibility needed for exerting the desired torsional return force to the nut throughout its range of travel.

As shown in FIG. 5, the leaf springs 52, 54, 56 are attached at corresponding ends 52a, 54a, 56a thereof to the nut 14, such as by being inserted into machined keyways in the nut that provide an interference fit, welded, or bonded to the nut. The strength and manner of attachment may vary according to ordinary mechanical design practice to achieve the goals of fixing the attachment with respect to the entire range of contemplated rotation of the nut about the axis "R," and supporting the intended axial load. The leaf springs are supported at opposite ends 52b, 54b and 56b thereof by corresponding anchoring members 53, 55, and 57.

It is recognized that the use of more than one of the leaf springs, which is desirable and which may even be necessary in order to support high axial loads, causes a problem when the temperature changes over a wide range, such as between ambient and cryogenic temperatures. Particularly, the ends 52a, 52b of the leaf spring 52, the ends 54a, 54b of the leaf spring 54, and the ends 56a, 56b of the leaf spring 56 will move farther apart or closer together upon heating or cooling, respectively. It is also recognized that if the leaf springs are all rigidly attached to the nut and to fixed anchoring members 53, 55, and 57, and if this movement is different than the corresponding change in the spacing between the nut and the corresponding anchoring members, additional stresses will develop in the leaf springs that will change the amount of torsional return force they provide to the nut unless thermal expansion characteristics for all of these parts are matched exactly. This is not usually practical. Extreme amounts of such movement may buckle the leaf springs, or break their attachment to the nut.

To solve this problem, the invention provides the outstanding advantage of slip joints in all but one of the anchoring members. Where there are three leaf springs in the return mechanism 22 such as shown in FIG. 5, slip joints 58 and 60 are provided at two of the anchoring members such as 53 and 55. Relative expansion or contraction of the leaf spring 56 corresponding to the anchoring member 57 would displace the nut, but the slip joints used to attach the leaf springs 52 and 54 to the corresponding anchoring members 53 and 55 will accommodate this movement so that the nut is not displaced.

The anchoring members include slots 62 and 64, into which the leaf springs are inserted. The slip joints are formed of respective shim springs 66 and 68, which hold the leaf springs in place. The shim springs 65 and 68 bear elastically on the ends 52b, 54b and on the inside of the slots 62 and 64, so that the ends 52b, 54b may slide or slip in the slots 62, 64 yet remain pinned therein. The shim spring force is preferably balanced between providing a pinning force that is great enough to prevent radially inward or outward movement of the leaf springs in response to impact of the nut, yet small enough to permit the leaf springs to slip into the anchoring members without buckling as a result of changes in thermal expansion due to heating or cooling the device. A shim spring force of about ¼ to ½ of the leaf spring buckling load has been found to provide this balance.

Figures 6, 7A:
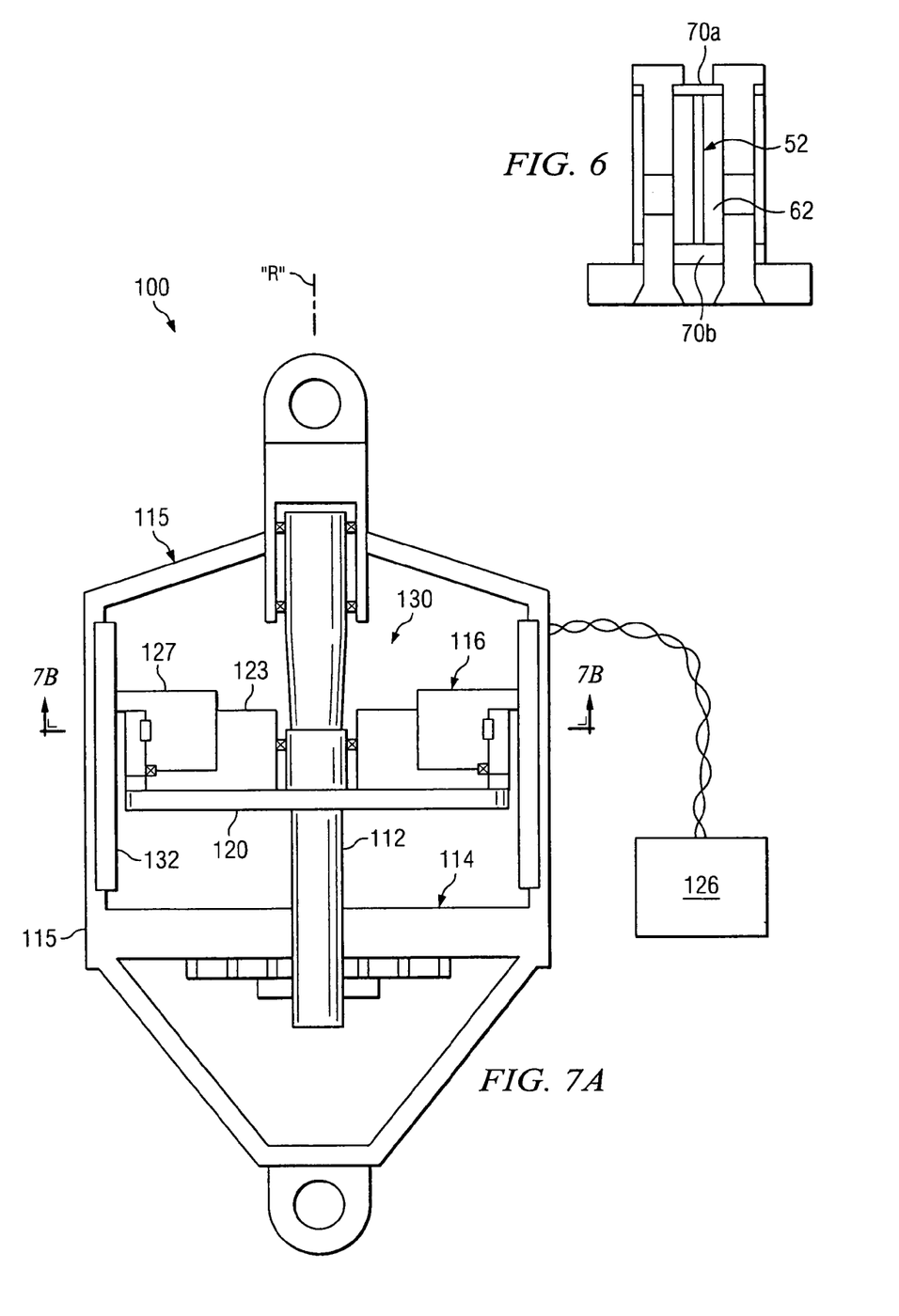
FIG. 6 is a section of an anchoring member of the return mechanism of FIG. 5 according to the present invention, taken along a line 6—6 thereof.
FIG. 7A is a side section of a second embodiment of an impact micro-positioning actuator according to the present invention.

As shown in FIG. 6, support covers 70a and 80b are mounted to the anchoring member over and under the slot 62 (or 64) to prevent the leaf spring 52 (or 54) from slipping or sliding in either axial direction, so that the slip joints do not impair the ability of the return mechanism 22 to support axial loads in either direction. It may be noted that, even in outer space, the nut 14 experiences an axial load in a particular direction when accelerating the load in that direction. By contrast, where the micro-positioning actuator is used in a gravitational field, for example, it may not be necessary or desirable to support the nut equally in both axial directions.

While the detailed return mechanism 22 has been shown and described as preferred, other mechanisms providing for returning the nut at rates sufficient to permit the biasing device 18 to couple the shaft and the nut together over at least a portion of the nut's return rotation may be employed without departing from the principles of the invention. Such other mechanisms may be further adapted to support the nut as well for axial loading, or may be used in conjunction with additional supporting mechanisms for the latter purpose.

By providing all of the structures and methods discussed in connection with each of the control aspects of the invention discussed above in an impacting device according to the present invention, it uniform step size for the shaft as small as approximately 10 nm may be achieved, in both directions, and in temperatures ranging from ambient to 40 degrees Kelvin. By employing fewer of the features performance will be less; however, the performance may still represent a substantial and desirable improvement over the prior art. The device is inherently simple, reliable, economical to produce, and works equally well at ambient and cryogenic temperatures,. It has an inherently large stroke, so there is no need to "change gears." Moreover, the device may be scaled to very small or very large versions, for positioning very small or very large loads (e.g., tons).

6. Second Embodiment of an Impact Micro-Positioning Actuator

Figure 7B:
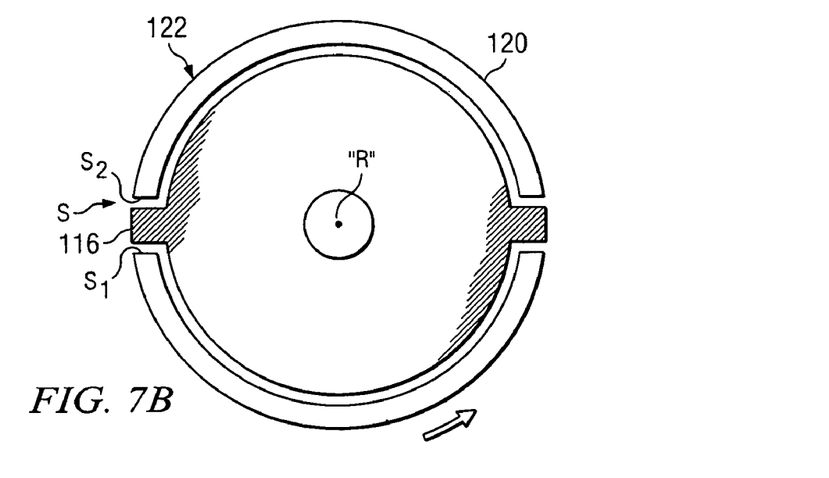
FIG. 7B is a view of the micro-positioning actuator of FIG. 7A taken along a line 7B—7B thereof.

FIGS. 7A and 7B show a second embodiment 100 of an impact actuator according to the present invention. The actuator 100 includes a threaded shaft 112 and a nut 114; however, by contrast with the actuator 10, the nut 114 is fixed to a housing 115 for the device. An impact member 122, such as a ring 120, having a slot "S", is fixedly attached to the shaft. The ring 120 may provide features of the inertial disk discussed above and may provide for two or more slots such as shown. Each of the slots "S" has faces "$S_1$" and "$S_2$."

An impacting member or hammer 116 is spaced within the slot "S", spaced from the faces "$S_1$" and "$S_2$" preferably by being centered therebetween in a neutral position as shown. Alternatively, other starting positions could be used that are biased from the neutral position. The hammer 116 may therefore be accelerated from its neutral position toward either face, to gather momentum for striking the face and, thereby, turning the shaft. For example, where the hammer 116 rotates in the direction of the arrow in FIG. 7B, it impacts the slot "S" at the face "$S_1$" and directly transfers momentum to turn the shaft about an axis of rotation "R" in the same direction. It is preferably provided that the hammer 116 is significantly less massive than the total mass of the impact member 122 and the shaft, so the hammer rebounds from the impact member as for the actuator 10. The shaft is in any case directly provided with an initial angular velocity of rotation about the axis "R." As for the actuator 10, It is desired to provide for an elastic collision between the hammer 116 and the impact member 122 in the actuator 100, so at least the portions of the faces "$S_1$" and "$S_2$" struck by the hammer, and the corresponding portions of the hammer, are formed of materials having a high elastic modulus.

The hammer 116 is preferably turned by a reversible electric motor 130. Particularly, in one embodiment of the actuator 100, a rotor 123 of the motor 130 is concentric with the shaft and the hammer 116 is attached to the rotor.

Figure 8:
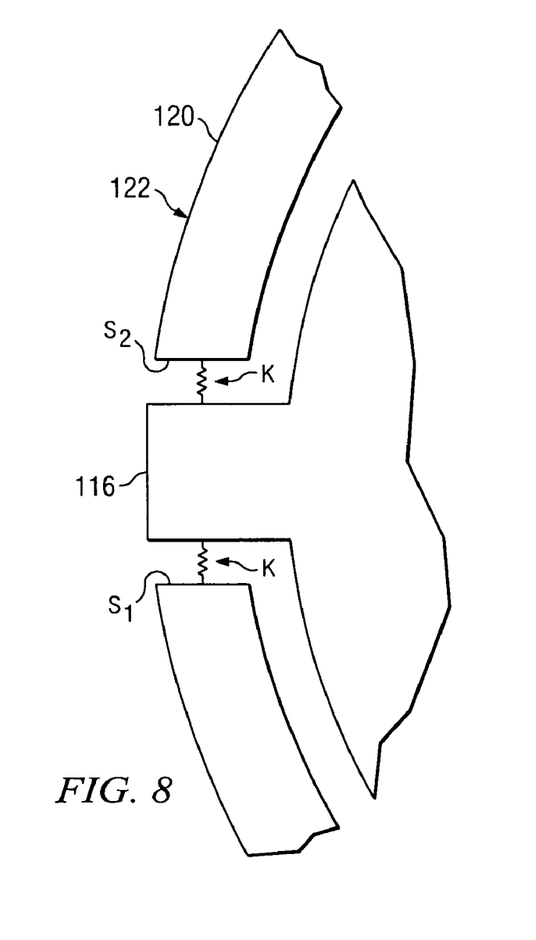
FIG. 8 is a schematic view of a portion of the actuator shown in FIG. 7B.

The motor 130 is controlled by a control system 126 to provide pulses analogous to those provided by the control system 44 for the actuator 10. The control system 126 may provide active feedback control for moving the hammer 116 after impact so that it remains within the slot "S" as the impact member 122 turns, without subsequently striking either face "S$_1$" or "S$_2$," and to place the hammer in its neutral or starting position therein so that it is ready for another strike. As will be readily appreciated by those of ordinary skill, such active feedback control requires a sensing means (not shown), which may be part of the motor, for sensing the angular position of the shaft and that of the motor rotor 123. Alternatively, the motor may be actively controlled open-loop, wherein turning increments are calibrated by testing. Yet another alternative is to use passive control analogous to that used for the actuator 10. Turning to FIG. 8, in this embodiment, one or more springs k between the hammer 116 and the impact member 122 may be used to bias the hammer 116 into a neutral or starting position within the slot "S." The spring force need not be strong enough to be able to move the stator so that it follows the shaft because the opposite face of the slot "S" will bring it along in any case.

The control system 126 provides for an impact mode of adjustment of the actuator 100 wherein current may be applied to the motor up until the time of impact, or the current may be stopped prior to impact. The force of friction between the nut and the shaft, which is preferably controlled in the same manner as described above for the device 10, is first overcome by the impact velocity provided by the hammer 116 but thereafter the shaft decelerates to a stop.

The impact mode is particularly useful to provide extremely fine position control, to move massive loads, or both. In addition, the device 100 also provides a continuous mode wherein the motor 130 is driven to produce continuous rotation of the shaft 112 through continuous rotation of the hammer 116, for translating the shaft relatively large amounts. The continuous mode is particularly useful for moving low loads, or for high speed position adjustment, or both. Where the load is constant, the continuous mode may be used, for example, for coarse adjustment in a feedback control positioning system in combination with fine adjustment provided by the impact mode.

In either mode of operation, the shaft will move along the axis "R" relative to the nut, carrying the impact member 122 with it. Therefore, the hammer 116 must also be able to move along this axis. Accordingly, referring back to FIG. 7A, the stator 127 of the motor 130 is provided with linear bearings 132 or other anti-rotating device that prevents rotation relative to the housing 115, but permits translation along the axis "R."

As an example of the positioning precision provided by the device 100 in impact mode, rotation of the shaft 122 for a single impact may be stopped by friction between the nut and the shaft within about 0.001 seconds, where the shaft has an average angular velocity of 0.3 radians/second. This provides about 0.00005 revolutions per impact, which for a shaft having a pitch of 10 threads per inch, results in linear translation of the shaft of about 5 millionths of an inch, or about 120 nanometers. The device 100 provides the same basic advantages of the device 10, as mentioned above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an impact micro-positioning actuator having an output shaft, a nut for threadingly receiving the output shaft, and an impacting device for producing an impact on the nut and thereby turning the nut relative to the output shaft, a method for controlling the amount of slip between the shaft and the nut, comprising the steps of:
    providing a bearing element for frictionally engaging a selected one of (a) the output shaft and (b) the nut;
    providing a housing for supporting said bearing element;
    mounting said housing to the other of said elements (a) and (b); and
    biasing said bearing element outwardly from said housing toward said selected one of (a) and (b) so that friction between said nut and shaft is dominant over the friction between said bearing element and said selected one of (a) and (b).

2. The method of claim 1, further comprising providing that said friction between said bearing element and said selected one of (a) and (b) is at least about three times less than said friction between said nut and said shaft.

3. The method of claim 2, wherein the third step of providing includes forming at least a bearing surface of said bearing element that makes intimate contact with said selected one of (a) and (b) of mechanical grade PTFE.

4. In an impact micro-positioning actuator having an output shaft, a nut for threadingly receiving the output shaft, and an impacting device for impacting the nut and thereby turning the nut relative to the output shaft, a mechanism for controlling slip between the nut and the shaft, comprising:
    a bearing element for frictionally engaging a selected one of (a) the output shaft and (b) the nut;
    a housing for supporting said bearing element mounted to the other of (a) and (b); and
    a biasing member for biasing said bearing element outwardly from said housing toward said selected one of (a) and (b), so that friction between said nut and shaft is dominant over the friction between said bearing element and said selected one of (a) and (b).

5. The device apparatus of claim 4, wherein said biasing member is a compression spring.

6. The apparatus of claim 4, wherein said housing is mounted to (b).

7. The apparatus of claim 4, wherein said housing is mounted to (a).

8. The apparatus of claim 4, wherein said bearing element includes a bearing surface formed of a material providing that said friction between said bearing element and said selected one of (a) and (b) is at least about three times less than said friction between said nut and said shaft.

9. The apparatus of claim 8, wherein said bearing element includes at least a bearing surface formed of mechanical grade PTFE.

10. The apparatus of claim 4, further comprising a dry lubricant between the threads of said nut and the corresponding threads of said shaft.

11. The apparatus of claim 4, wherein said nut and said shaft are formed of materials having substantially the same coefficient of thermal expansion, so as to permit substantially the same operating characteristic at both ambient and cryogenic temperatures.

12. In an impact micro-positioning actuator having an elongate output shaft having a length in a first dimension parallel to the elongate axis of the shaft and a shaft diameter in a second, perpendicular dimension that is less than said length, a nut for threadingly receiving the output shaft, and an impacting device for producing an impact on the nut and thereby turning the nut relative to the output shaft, a method for controlling the amount of slip provided between the nut and the shaft comprising the steps of:

provivding an inertial control disk having a center of rotation aligned with the axis of rotation of the shaft, said inertial control disk having a disk diameter in said second dimension and a length in said first dimension that is less than said disk diameter, and mounting said inertial control disk to the shaft.

13. An impact micro-positioning actuator comprising:

an elongate output shaft having a length in a first dimension parallel to the elongate axis of the shaft and a shaft diameter in a second, perpendicular dimension that is less than said length;

a nut for threadingly receiving said output shaft;

an impacting device for producing an impact on said nut and thereby turning said nut relative to the output shaft; and an inertial control disk having a center of rotation aligned with the axis of rotation of the shaft, said inertial control disk having a disk diameter in said first dimension and a length in said second dimension that is less than said disk diameter.

* * * * *